United States Patent
Cai et al.

(10) Patent No.: US 10,773,347 B2
(45) Date of Patent: Sep. 15, 2020

(54) DISMANTLING MECHANISM WITH CONVEX CURVED BACKPLATE AND DISMANTLING DEVICE FOR DISPLAY MODULE

(71) Applicants: BOE Technology Group Co., Ltd., Beijing (CN); Hefei BOE Optoelectronics Technology Co., Ltd., Hefei (CN)

(72) Inventors: Guangyuan Cai, Beijing (CN); Youhao Sun, Beijing (CN)

(73) Assignees: BOE Technology Group Co., Ltd., Beijing (CN); Hefei BOE Optoelectronics Technology Co., Ltd., Hefei, Anhui (CN)

( * ) Notice: Subject to any disclaimer, the term of this patent is extended or adjusted under 35 U.S.C. 154(b) by 300 days.

(21) Appl. No.: 15/782,502

(22) Filed: Oct. 12, 2017

(65) Prior Publication Data

US 2018/0117721 A1 May 3, 2018

(30) Foreign Application Priority Data

Oct. 28, 2016 (CN) .......................... 2016 1 0960053

(51) Int. Cl.
*B23P 19/04* (2006.01)
*G02F 1/13* (2006.01)
*B65G 37/00* (2006.01)

(52) U.S. Cl.
CPC ............ *B23P 19/04* (2013.01); *G02F 1/1303* (2013.01); *B65G 37/00* (2013.01)

(58) Field of Classification Search
CPC ......... B23P 19/04; G02F 1/1303; B65G 37/00
See application file for complete search history.

(56) References Cited

U.S. PATENT DOCUMENTS

| | | | | |
|---|---|---|---|---|
| 4,685,991 A | * | 8/1987 | Herrmann | B26D 3/282 156/701 |
| 6,227,276 B1 | * | 5/2001 | Kim | B29C 63/0013 156/763 |
| 2014/0150981 A1 | * | 6/2014 | Itou | B32B 38/1858 156/714 |
| 2018/0117721 A1 | * | 5/2018 | Cai | G02F 1/1303 |

* cited by examiner

*Primary Examiner* — Minh N Trinh
(74) *Attorney, Agent, or Firm* — Banner & Witcoff, Ltd.

(57) ABSTRACT

A dismantling mechanism with convex curved backplate and dismantling device for a display module are disclosed. The dismantling mechanism for the display module includes: a screen fixture configured to carry and secure a screen of the display module when dismantling the display module; a convex curved backplate arranged opposite to the screen fixture, configured to support a cover board of the display module when dismantling the display module; a moveable first dismantling structure configured to drive a first end of the cover board to move in a direction adjacent to the convex curved backplate when dismantling the display module; a first actuator connected with the first dismantling structure and configured to drive the first dismantling structure to move; and a second dismantling structure configured to at least partially support a second end of the cover board away from the first end when dismantling the display module.

12 Claims, 5 Drawing Sheets

DISMANTLING MECHANISM WITH CONVEX CURVED BACKPLATE AND DISMANTLING DEVICE FOR DISPLAY MODULE

This application claims priority to and the benefit of Chinese Patent Application No. 201610960053.7 filed on Oct. 28, 2016, which application is incorporated herein in its entirety.

TECHNICAL FIELD

Embodiments of the present disclosure relate to a dismantling mechanism and dismantling device for a display module.

BACKGROUND

Liquid crystal displays (LCDs) have been widely used in the display technique field. As for the liquid crystal display modules of the liquid crystal displays belonging to a same batch, some defectiveness inevitably occur in some product in the production process, and the resultant faulty liquid crystal display module(s) may be directly abandoned, and they also can be reprocessed so as to reduce material wastage and thus reduce the production cost.

Presently, manually dismantling is usually performed for dismantling a cover board of the liquid crystal display module to be reprocessed. The manually dismantling is easy to cause breakage of the glass substrate used in the liquid crystal display module and ultimately leads to product scratch, and it is easy to cause the operator to be cut while wasting manpower.

SUMMARY

An embodiment of the present disclosure provides a dismantling mechanism for the display module, comprising: a screen fixture configured to carry and secure a screen of the display module when dismantling the display module; a convex curved backplate arranged opposite to the screen fixture, configured to support a cover board of the display module when dismantling the display module; a moveable first dismantling structure configured to drive a first end of the cover board to move in a direction adjacent to the convex curved backplate when dismantling the display module; a first actuator connected with the first dismantling structure and configured to drive the first dismantling structure to move; and a second dismantling structure configured to at least partially support a second end of the cover board away from the first end when dismantling the display module.

For example, in the dismantling mechanism of an embodiment, a surface of the convex curved backplate adjacent to the screen fixture is part of a cylindrical lateral surface.

For example, in the dismantling mechanism of an embodiment, a radius of curvature of the convex curved face of the convex curved backplate is greater than 200 mm.

For example, in the dismantling mechanism of an embodiment, a radius of curvature of the convex curved face of the convex curved backplate ranges from 300 mm to 400 mm.

For example, in the dismantling mechanism of an embodiment, a first distance between a first end of the convex curved backplate adjacent to the first dismantling structure and the securing surface of the screen is greater than a second distance between a second end of the convex curved backplate adjacent to the second dismantling structure and the securing surface of the screen.

For example, in the dismantling mechanism of an embodiment, the first dismantling structure comprises a first connection member and a first support member, and the first connection member is configured to connect the first actuator and the first support member.

For example, the dismantling mechanism of an embodiment further comprises a second actuator; the second actuator is configured to drive the second dismantling structure to move, and the second dismantling structure is further configured to be able to drive the second end of the cover board away from the first end to move, the second dismantling structure comprises a second connection member and a second support member, and the second connection member is configured to connect the second actuator and the second support member.

For example, in the dismantling mechanism of an embodiment, the screen fixture comprises a suction chuck configured to absorb the screen of the display module when dismantling the display module.

For example, the dismantling mechanism of an embodiment further comprises a gas-pumping-deflating component configured to be able to pumping and deflating the suction chuck to absorb the screen of the display module.

For example, in the dismantling mechanism of an embodiment, a material for producing the first dismantling structure and the second dismantling structure comprises aluminum alloy and/or Teflon, or a combination thereof.

For example, in the dismantling mechanism of an embodiment, the first actuator is at least one of a pneumatic actuator, a hydraulic actuator, an electrical motor or manual actuator, or any combination thereof.

For example, in the dismantling mechanism of an embodiment, the second actuator is at least one of a pneumatic actuator, a hydraulic actuator, an electrical motor or manual actuator, or any combination thereof.

Another embodiment of the present disclosure provides a dismantling device comprising any one of the above-described dismantling mechanisms.

For example, the dismantling device of an embodiment further comprises a freezing apparatus configured to freeze the display module to be dismantled.

For example, the dismantling device of an embodiment further comprises: a loading carrier platen configured to carry the display module to be dismantled; a conveyor belt for screen configured to transmit the screen dismantled from the display module; a conveyor belt for cover board configured to transmit the cover board dismantled from the display module; and a robot arm configured to move at least one of the display module, the screen and the cover board.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In the following, the embodiments of the present disclosure will be described in a clear and complete manner in connection with the drawings.

The dismantling mechanism and the dismantling device for the display module provided by an embodiment of the present disclosure can dismantle the display module to be reprocessed, replace the manually dismantling manner with a mechanically dismantling manner, thereby it can depress or avoid product scratch and operator cut caused by the breakage of the glass substrate of the display module, and at the same time, it is also possible to save manpower, reduce production costs, improve automation level of the procedure and reduce the operating space.

Figure 1:
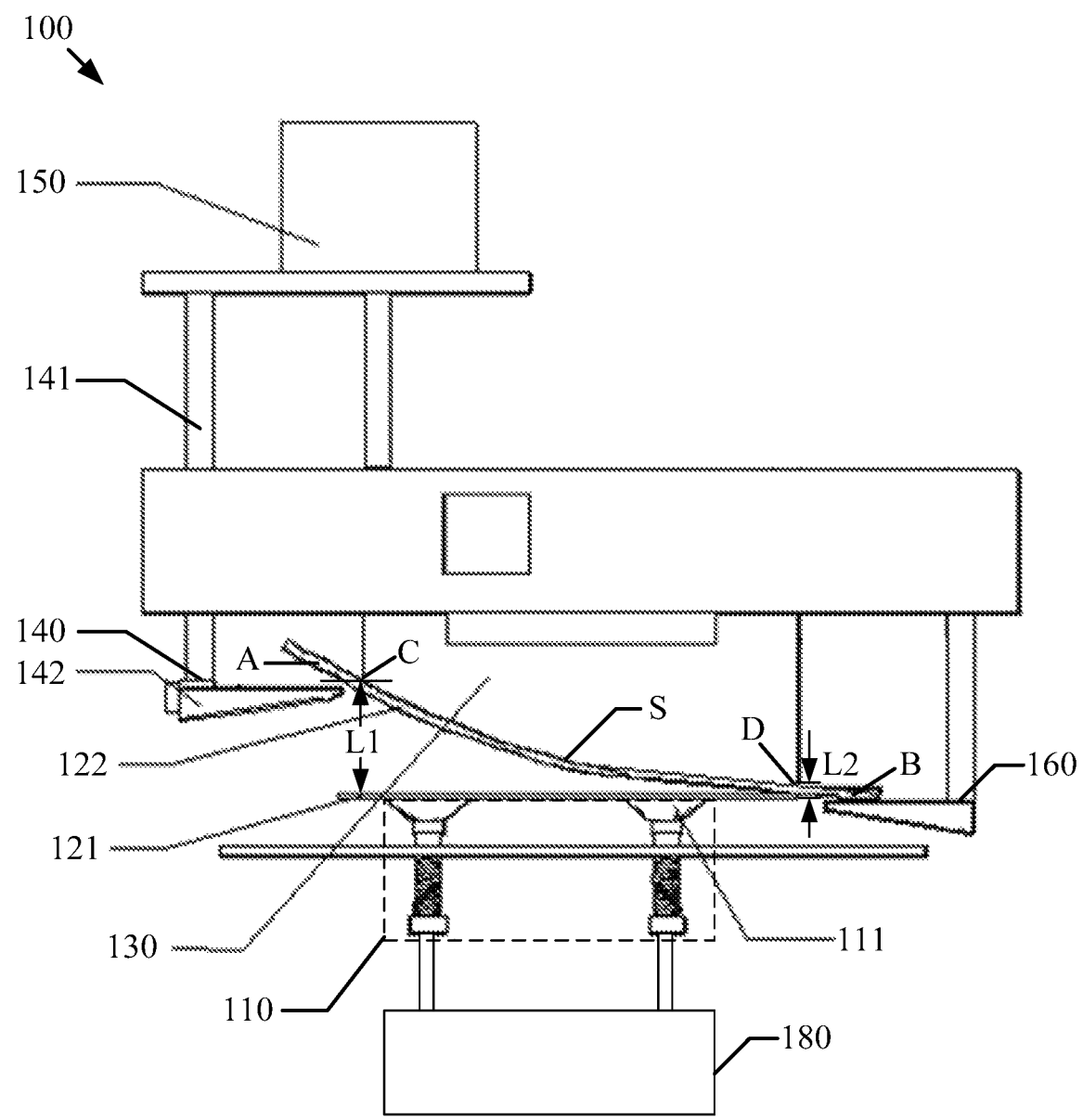
FIG. 1 is a first side schematic view of the dismantling mechanism provided by an embodiment of the present disclosure.

An embodiment of the present disclosure provides a dismantling mechanism 100 for a display module, as illustrated in FIG. 1, the dismantling mechanism 100 comprises a screen fixture 110, a convex curved backplate 130 arranged opposite to the screen fixture 110, a moveable first dismantling structure 140, a first actuator 150, and a second dismantling structure 160. The screen fixture 110 is configured to carry and secure the screen 121 of the display module when dismantling the display module; the convex curved backplate 130 is configured to support the cover board 122 of the display module (e.g., the glass substrate) when dismantling the display module; the first dismantling structure 140 is configured to drive the first end A of the cover board 122 to move in a direction adjacent to the convex curved backplate 130 (i.e., to move in the upward direction in FIG. 1) when dismantling the display module; the first actuator 150 connects with the first dismantling structure 140, and is configured to drive the first dismantling structure 140 to move; the second dismantling structure 160 is configured to at least partially support the second end B of the cover board 122 in the process of dismantling the display module, and the second end B is away from the first end A.

For example, as illustrated in FIG. 1, in the dismantling mechanism 100 provided by the embodiment of the present disclosure, the surface S of the convex curved backplate 130 adjacent to the screen fixture 110 is part of a cylindrical lateral surface. That is to say, the surface S of the convex curved backplate 130 is a cylindrical surface.

For example, in the dismantling mechanism 100 provided by the embodiment of the present disclosure, the radius of curvature of the convex curved face of the convex curved backplate 130 is greater than 200 mm. Still farther, for example, in the dismantling mechanism 100 provided by the embodiment of the present disclosure, the radius of curvature of the convex curved face of the convex curved backplate 130 ranges from 300 mm to 400 mm.

For example, when the radius of curvature of the convex curved face S of the convex curved backplate is set within the above-mentioned range, it is possible to prevent the cover board 122 from being broken in an excessive bending state when the display module is dismantled.

For example, as illustrated in FIG. 1, in the dismantling mechanism 100 provided by the embodiment of the present disclosure, the first distance L1 between the first end C of the convex curved backplate 130 adjacent to the first dismantling structure 140 and the securing surface of the screen (i.e., the surface on which the screen 121 is located as illustrated in FIG. 1) is greater than the second distance L2 between the second end D of the convex curved backplate 130 adjacent to the second dismantling structure 160 and the securing surface of the screen. For example, the distance of the convex curved face S to the securing surface of the screen is monotonically or linearly decreased from the first end C to the second end D of the convex curved backplate 130, thereby facilitating dismantling the display module from the first end A of the cover board 122.

For example, in the dismantling mechanism 100 provided by the embodiment of the present disclosure, the first dismantling structure 140 comprises a first connection member 141 and a first support member 142, the first connection member 141 is configured to connect the first actuator 150 and the first support member 142. For example, the first actuator 150 provides power for the movement of the first connection member 141, and then drives the first support member 142 to move by means of the first connection member 141. As illustrated in the drawings, the first support member 142 is secured to the first connection member 141, and for example extends horizontally and configured to have a plan shape of plate, bar or the like and a sectional shape of wedge, bar or the like and can provide support function at its end opposite to the first connection member 141.

For example, in the dismantling mechanism 100 as illustrated in FIG. 1, the second dismantling structure 160 can be stationary, and for example is merely used to support the cover board 122 of the display module in the process of dismantling the display module.

For example, in the dismantling mechanism 100 provided by the embodiment of the present disclosure, the first actuator 150 can be one of a pneumatic actuator, a hydraulic actuator, an electrical motor or manual actuator, or a combination thereof, for example, the first actuator may employ a step motor so as to achieve accuracy control. For example, when the first actuator 150 is a pneumatic actuator, it is possible to adjust the clamping force between the first support member 142 and the cover board 122 by regulating the pressure inside the cylinder of the pneumatic actuator. For example, the first connection member 141 is a lead screw, a driving rod, or the like.

For example, in the dismantling mechanism 100 provided by the embodiment of the present disclosure, the screen fixture 110 comprises a suction chuck 111 configured to absorb the screen 121 of the display module when dismantling the display module. For example, the suction chuck 111 can be made of rubber or other flexible material(s), thus ensuring the adsorption force and preventing the screen 121 from being scratched when absorbing the screen 121. For example, the quantity of the suction chuck 111 is not limited to the case as illustrated in FIG. 1, but can be set flexibly according to the size, material and the like of the screen 121.

For example, the dismantling mechanism 100 provided by the embodiment of the present disclosure may further comprise a gas-pumping-deflating component 180 configured to be able to pump and deflate the suction chuck 111 to absorb the screen 121 of the display module. For example, the gas-pumping-deflating component 180 comprises an air pump and a gas-pumping-deflating pipeline, the air pump and the suction chuck 111 are connected through the gas-pumping-deflating pipeline and thus can pump and deflate the suction chuck 111, so as to control the suction chuck 111 to absorb the screen 121 when the display module is dismantled, and disengage from the screen 121 after the completion of the dismantling.

Figure 2:
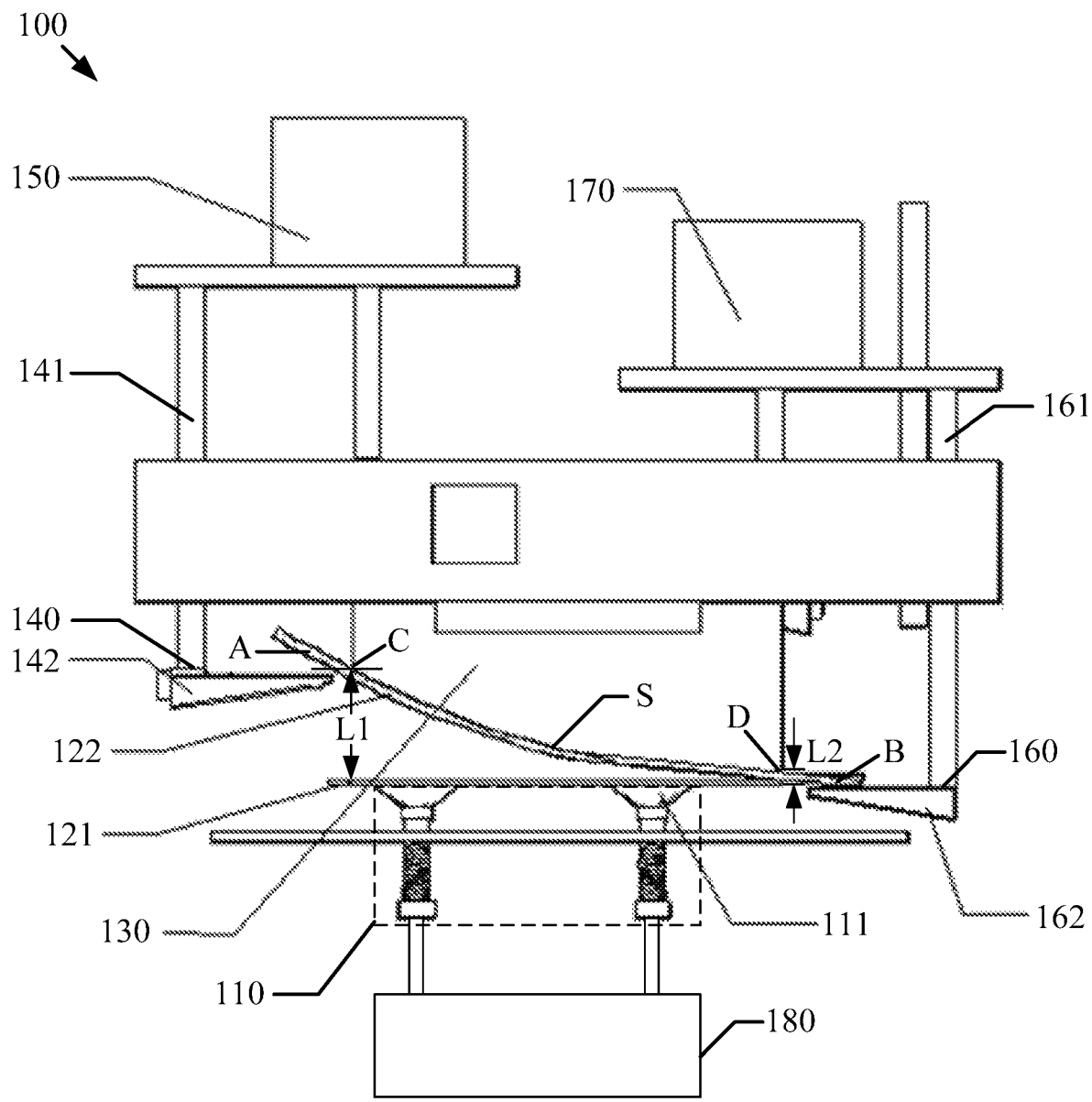
FIG. 2 is a second side schematic view of the dismantling mechanism provided by an embodiment of the present disclosure.
Figure 3:
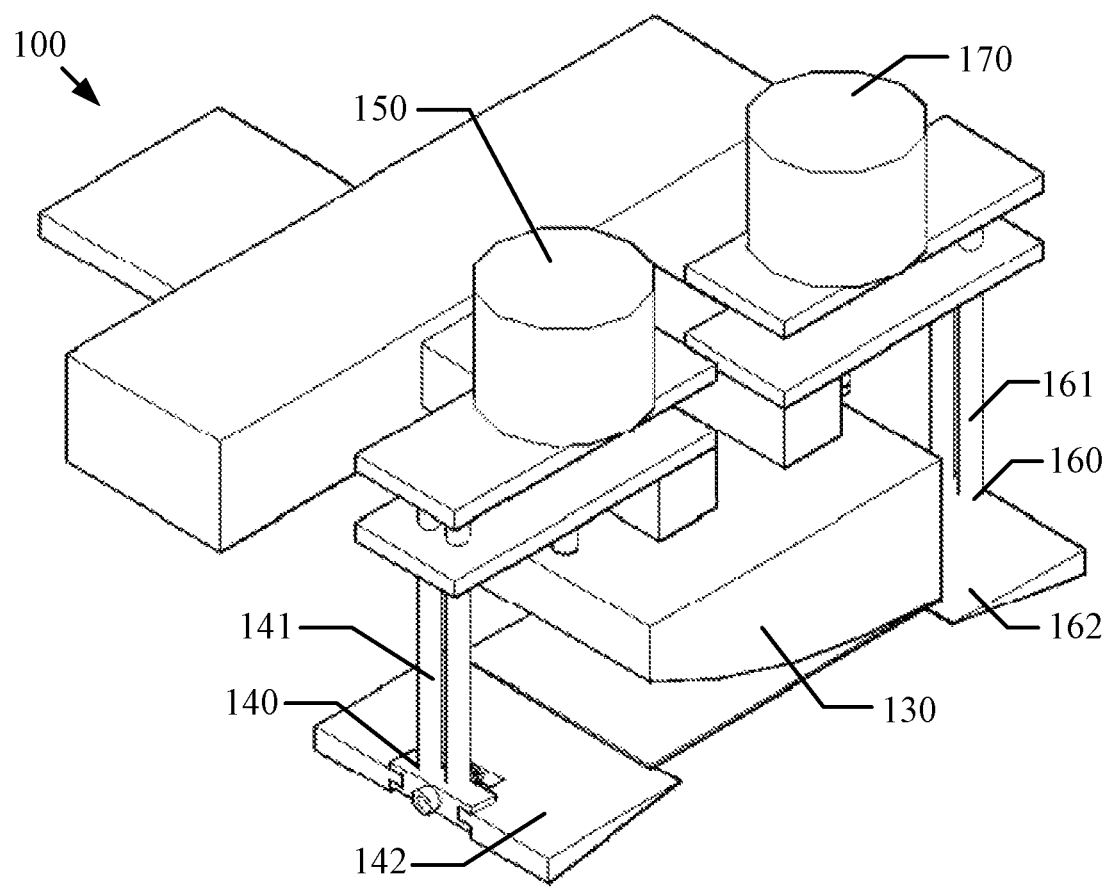
FIG. 3 is a perspective schematic view of a partial structure of the dismantling mechanism as illustrated in FIG. 2 provided by an embodiment of the present disclosure.

For example, on the basis of the dismantling mechanism as illustrated in FIG. 1, the dismantling mechanism 100 provided by the embodiment of the present disclosure may further comprise a second actuator 170. As illustrated in FIGS. 2 and 3, the second actuator 170 may drive the second dismantling structure 160 to move, the second dismantling structure 160 is further configured to be able to drive the second end B of the cover board 122 away from the first end A to move, the second dismantling structure 160 comprises a second connection member 161 and a second support member 162, and the second connection member 161 is configured to connect the second actuator 170 and the second support member 162. As illustrated in the drawings, the second support member 162 is secured to the second connection member 161, and for example extends horizontally and configured to have a plan shape of plate, bar or the like and a sectional shape of wedge, bar or the like and can provide support function at its end opposite to the second connection member 161.

For example, in the dismantling mechanism 100 provided by the embodiment of the present disclosure, the second actuator can be one of a pneumatic actuator, a hydraulic actuator, an electrical motor or manual actuator, or a combination thereof, for example, the second actuator may employ a step motor and the like to achieve accuracy control. For example, when the second actuator 170 is a pneumatic actuator, it is possible to adjust the clamping force between the second support member 162 and the cover board 122 by regulating the pressure inside the cylinder of the pneumatic actuator. For example, the second connection member 161 is a lead screw, a driving rod, or the like.

For example, in the dismantling mechanism 100 provided by the embodiment of the present disclosure, the material for producing the first dismantling structure 140 and the second dismantling structure 160 may comprise at least one of aluminum alloy or Teflon, or a combination thereof, however, it is not limited thereto, but can be other material(s), such as ceramics etc. For example, the first support member 142 of the first dismantling structure 140 is made of aluminum alloy or Teflon, or a combination thereof; the second support member 162 of the second dismantling structure 160 is made of aluminum alloy or Teflon, or a combination thereof.

For example, when dismantling the display module, the liquid crystal screen 121 of the display module is placed to face the suction chuck 111, the cover board 122 is placed to face the convex curved backplate 130, and the suction chuck 111 absorbs the screen 121 of the display module; the convex curved backplate 130 is disposed at or descends to be close to the surface of the cover board 122; the second support member 162 of the second dismantling structure 160 is disposed or moved below the second end B of the cover board 122 to support the cover board 122; the first dismantling structure 140 is moved to the first end A of the cover board 122, and the first support member 142 is inserted from below the cover board 122, subsequently, the first dismantling structure 140 drives the first end A of the cover board to move upward (i.e., to move in the direction adjacent to the convex curved backplate 130), so that the cover board 122 is curved, the screen 121 is separated from the cover board 122, and under the action of the bending force together with the suction force of the suction chuck, the glue at other portions of the display module also continues to crack, the cover board 122 and the screen 121 of the display module are dismantled; after completing the dismantling, the suction chuck 111 is deflated by the gas-pumping-deflating component 180, so that the pressure inside the suction chuck is equal to ambient pressure, facilitating the action of taking out of the screen 121. For example, in the process of dismantling the display module, the second support member 162 of the second dismantling structure 160 may also drive the second end B of the cover board 122 to move upward, so that the cover board 122 and the convex curved backplate 130 come into more intimate contact with each other.

For example, the first dismantling structure 140 and the second dismantling structure 160 may move traversally so as to adapt display modules of different sizes.

Figure 4:
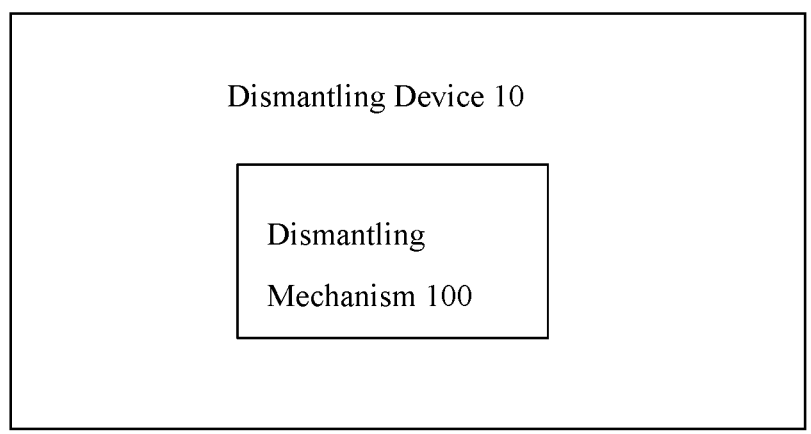
FIG. 4 is a first side schematic view of the dismantling device provided by an embodiment of the present disclosure.

An embodiment of the present disclosure also provides a dismantling device 10, as illustrated in FIG. 4, the dismantling device 10 comprises a dismantling mechanism 100 provided by any one of the embodiments of the present disclosure.

Figure 5:
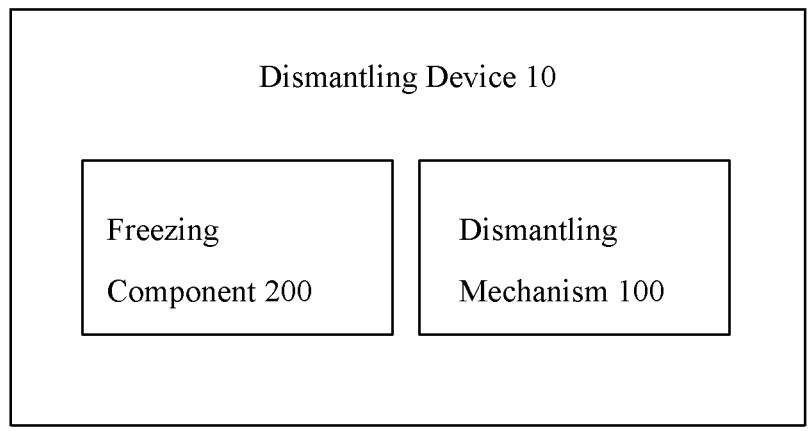
FIG. 5 is a second side schematic view of the dismantling device provided by an embodiment of the present disclosure.
Figure 6:
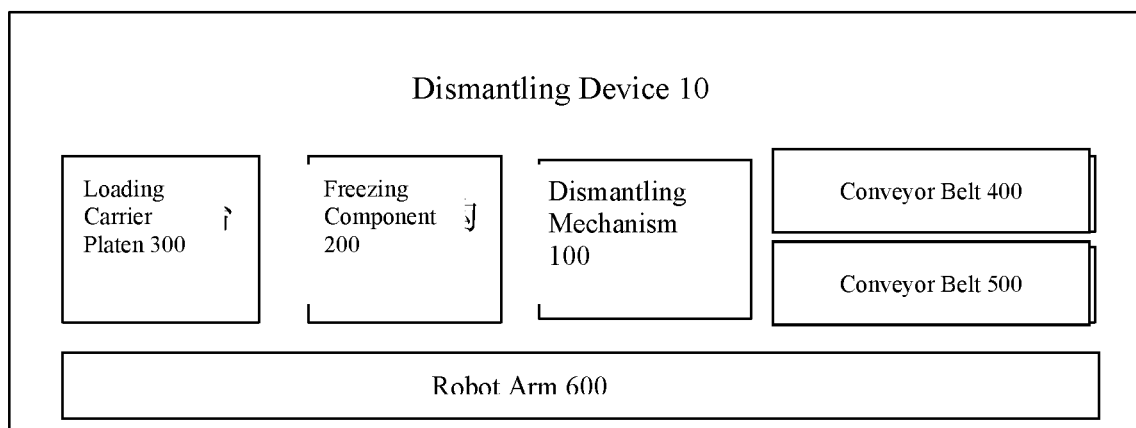
FIG. 6 is a third side schematic view of the dismantling device provided by an embodiment of the present disclosure.

For example, as illustrated in FIG. 5, the dismantling device 10 provided by an embodiment of the present disclosure may further comprise a freezing apparatus (e.g., freezer) 200 configured to freeze the display module to be dismantled. For example, before dismantling the display module, freezing the display module to be dismantled can cause the glue in the display module to become brittle, thus reducing its viscosity or adhesive force, which is in favor of the dismantling of the display module. The freezing apparatus 200 can be rapidly cooled by using, for example, dry ice (carbon dioxide ice).

For example, the dismantling device 10 provided by the embodiment of the present disclosure, as illustrated in FIGS.

3 and 7, the dismantling device 10 may further comprise a loading carrier platen 300, a conveyor belt 400 for screen, a conveyor belt 500 for cover board, and a robot arm 600. The loading carrier platen 300 is configured to carry the display module to be dismantled; the conveyor belt 400 for screen is configured to transmit the screen 121 to be dismantled away from the display module; the conveyor belt 500 for cover board is configured to transmit the cover board 122 to be dismantled from the display module; the robot arm 600 is configured to move at least one of the display module, the screen, and the cover board.

Figure 7:
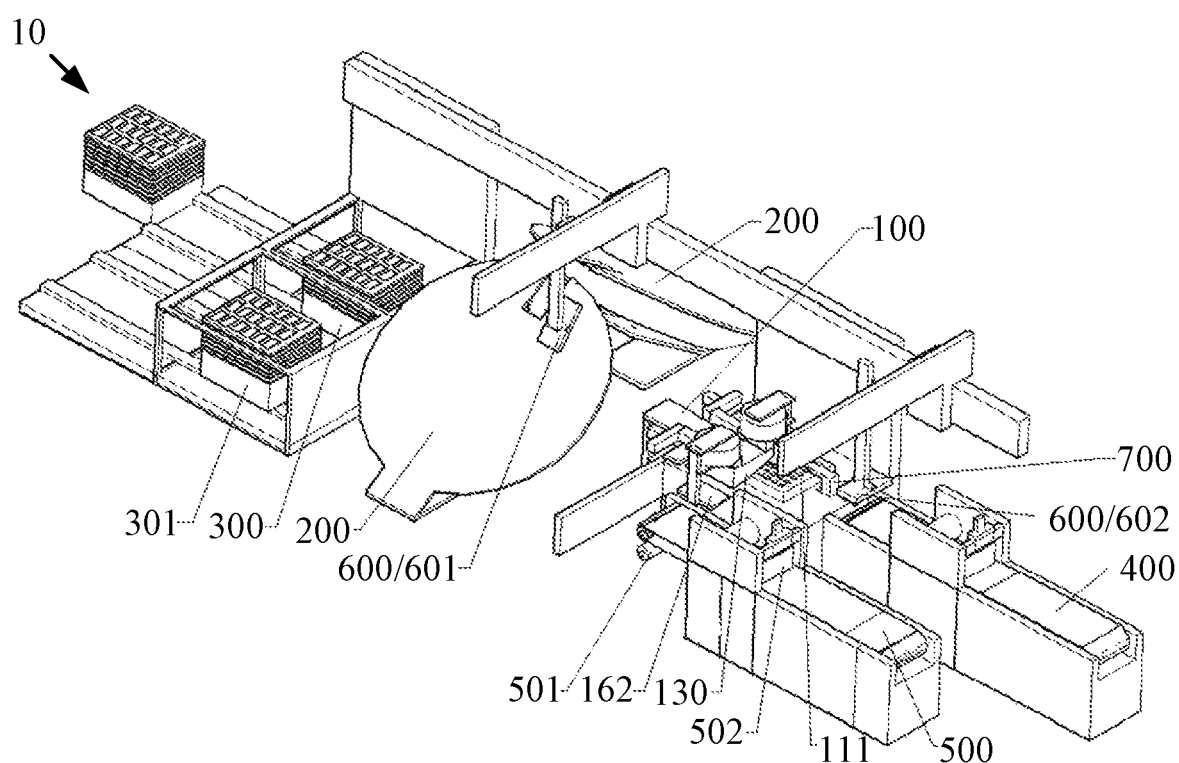
FIG. 7 is a perspective schematic view of the dismantling device provided by an embodiment of the present disclosure.

For example, as illustrated in FIG. 7, the robot arm 600 may comprise a first robot arm 601 and a second robot arm 602 respectively used to achieve movements of the components in different processes. To be specified, the structure and quantity of the robot arms 600 are not limited to the case as illustrated in FIG. 7, but the robot arm 600 can be set according to the specific structure of the dismantling device 10.

For example, as illustrated in FIG. 7, the dismantling device 10 may further comprise an empty disk collecting carrier platen 301, a display module stopper pawl 700 and the like.

For example, the operation of the dismantling device 10 as illustrated in FIG. 7 will be described below. The display module to be dismantled is placed onto the loading carrier platen 300, and the empty disk after the completion of loading can be collected by the empty disk collecting carrier platen 301; the first robot arm 601 is used to take out the display module to be dismantled from the loading carrier platen 300 and place it into the freezing apparatus 200 to have it be frozen; after the completion of the freezing operation, the first robot arm 601 is again used to take out the display module from the freezing apparatus 200 and place it onto the screen fixture 110, and here the display module stopper pawl 700 can restrict the position where the display module is placed; the suction chuck 111 of the screen fixture 110 absorbs the screen of the display module; then the first dismantling structure, the second dismantling structure, and the convex curved backplate cooperate to dismantle the cover board and the screen of the display module so as to be separated from each other; the second robot arm 602 places the dismantled cover board onto the conveyor belt 500 for cover board, and the conveyor belt 500 for cover board conveys the dismantled cover board to the subsequent process; the second robot arm 602 places the dismantled screen onto the conveyor belt 400 for screen, and the conveyor belt 400 for screen conveys the screen to the next process.

For example, the display module stopper pawl 700 can be set flexibly according to the shape and size of the display module to be dismantled.

For example, the conveyor belt 500 for cover board may further comprises a roll film installation supplying roller 501 and a roll film cutting knife 502, and the roll film installation supplying roller 501 and the roll film cutting knife 502 are provided to achieve automatic film adhering and film slitting during the transporting, thus preventing the cover board from being contaminated in the transport process.

What are described above is related to the illustrative embodiments of the disclosure only and not limitative to the scope of the disclosure; the scopes of the disclosure are defined by the accompanying claims.

The application claims priority to the Chinese patent application No. 201610960053.7, filed Oct. 28, 2016, the entire disclosure of which is incorporated herein by reference as part of the present application.

What is claimed is:

1. A dismantling mechanism for a display module, comprising:
    a screen fixture configured to carry and secure a screen of the display module when dismantling the display module;
    a convex curved backplate arranged opposite to the screen fixture, configured to support a cover board of the display module when dismantling the display module;
    a moveable first dismantling structure configured to drive a first end of the cover board to move in a direction adjacent to the convex curved backplate when dismantling the display module;
    a first actuator connected with the first dismantling structure and configured to drive the first dismantling structure to move; and
    a second dismantling structure configured to at least partially support a second end of the cover board away from the first end when dismantling the display module.

2. The dismantling mechanism according to claim 1, wherein a surface of the convex curved backplate adjacent to the screen fixture is part of a cylindrical lateral surface.

3. The dismantling mechanism according to claim 2, wherein a radius of curvature of the surface of the convex curved backplate is greater than 200 mm.

4. The dismantling mechanism according to claim 2, wherein a radius of curvature of the surface of the convex curved backplate ranges from 300 mm to 400 mm.

5. The dismantling mechanism according to claim 1, wherein a first distance between a first end of the convex curved backplate adjacent to the first dismantling structure and a securing surface of the screen, is greater than a second distance between a second end of the convex curved backplate adjacent to the second dismantling structure and the securing surface of the screen.

6. The dismantling mechanism according to claim 1, wherein the first dismantling structure comprises a first connection member and a first support member, and the first connection member is connectively attached between the first actuator and the first support member.

7. The dismantling mechanism according to claim 1, further comprising a second actuator,
    wherein the second actuator is configured to drive the second dismantling structure to move, and the second dismantling structure is further configured to be able to drive the second end of the cover board away from the first end to move, the second dismantling structure comprises a second connection member and a second support member, and the second connection member is connectively attached between the second actuator and the second support member.

8. The dismantling mechanism according to claim 7, wherein the second actuator is at least one of a pneumatic actuator, a hydraulic actuator, an electrical motor, or manual actuator, or any combination thereof.

9. The dismantling mechanism according to claim 1, wherein the first actuator is at least one of a pneumatic actuator, a hydraulic actuator, an electrical motor, or manual actuator, or any combination thereof.

10. The dismantling mechanism according to claim 1, wherein a material of the first dismantling structure and the second dismantling structure comprises a least one of aluminum alloy or Teflon, or a combination thereof.

11. A dismantling mechanism for a display module, comprising:

a screen fixture configured to carry and secure a screen of the display module when dismantling the display module;

a convex curved backplate arranged opposite to the screen fixture, configured to support a cover board of the display module when dismantling the display module;

a moveable first dismantling structure configured to drive a first end of the cover board to move in a direction adjacent to the convex curved backplate when dismantling the display module;

a first actuator connected with the first dismantling structure and configured to drive the first dismantling structure to move; and a second dismantling structure configured to at least partially support a second end of the cover board away from the first end when dismantling the display module, wherein the screen fixture further comprises a suction chuck configured to absorb the screen of the display module when dismantling the display module.

12. The dismantling mechanism according to claim 11, further comprising a gas-pumping-deflating component configured to be able to pump and deflate the suction chuck to absorb the screen of the display module.

* * * * *